United States Patent
Yang et al.

(10) Patent No.: US 7,725,529 B2
(45) Date of Patent: May 25, 2010

(54) GEOGRAPHIC INFORMATION SYSTEM

(75) Inventors: Chaowei Yang, Manassas Park, VA (US); Menas Kafatos, Fairfax Station, VA (US); David W. Wong, Herndon, VA (US); Henry D. Wolf, Falls Church, VA (US); Ruixin Yang, Fairfax, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 1011 days.

(21) Appl. No.: 10/989,640

(22) Filed: Nov. 17, 2004

(65) Prior Publication Data

US 2005/0165788 A1    Jul. 28, 2005

Related U.S. Application Data

(60) Provisional application No. 60/523,105, filed on Nov. 19, 2003.

(51) Int. Cl.
*G06F 15/16* (2006.01)
*G06F 17/00* (2006.01)
(52) U.S. Cl. .................. 709/203; 709/219; 715/277
(58) Field of Classification Search ................ 709/203, 709/246, 230
See application file for complete search history.

(56) References Cited

U.S. PATENT DOCUMENTS

| | | | |
|---|---|---|---|
| 6,218,965 B1 * | 4/2001 | Gendron et al. | 701/208 |
| 6,970,929 B2 * | 11/2005 | Bae et al. | 709/226 |
| 7,315,259 B2 * | 1/2008 | Sacks | 340/995.1 |
| 2001/0045949 A1 * | 11/2001 | Chithambaram et al. | 345/418 |
| 2004/0119611 A1 * | 6/2004 | Oh et al. | 340/995.12 |
| 2004/0230371 A1 * | 11/2004 | Vincent et al. | 701/200 |

OTHER PUBLICATIONS

Yang et al., "Performance-improving techniques in web-based GIS", Mar. 2005, International Journal of Geographical Information Science, vol. 19, No. 3, pp. 319-342.*

* cited by examiner

*Primary Examiner*—Aaron Strange
(74) *Attorney, Agent, or Firm*—David G. Grossman; Esmael Dinan

(57) ABSTRACT

Disclosed is a geographic information system which comprises a multithreading client and a multithreading server cluster. The multithreading client includes at least one user interface, at least one client coordinator, map data, at least one map manager, at least one client-side spatial analyzer, at least one cache manager, at least one data requester, and at least one information communicator. The multithreading server cluster includes: at least one servlet, at least one image accessor, at least one map configuration mechanism; at least one data storage access mechanism, at least one data source manager, and at least one server-side spatial manager.

16 Claims, 18 Drawing Sheets

GEOGRAPHIC INFORMATION SYSTEM

CROSS REFERENCE TO RELATED APPLICATIONS

The present application claims benefit of provisional patent application Ser. No. 60/523,105 to Yang et al., filed on Nov. 19, 2003, entitled "Geographic Information System," which is hereby incorporated by reference.

BACKGROUND OF THE INVENTION

The fast-paced development of a geographic information system ("GIS") has triggered some researchers to reconsider the fundamental essence of GIS and its social implications. GIS (sometimes described by the term "media") has been widely used in various types of business, government and university projects. For instance, in North America alone, the value of the GIS market, even in a slow economy, can increase from $1.4 billion in 2001 to $2.0 billion in 2004. This market value will continue to expand because GIS is finding new markets on the Internet. Today, GIS serves as a means of communication by conveying information and knowledge to the public. This booming trend of GIS is potentially attributable to many, but at least two primary factors: the building of the Spatial Data Infrastructure (SDI) worldwide, and the dazzling development of computing technology and information technology in general.

During the past decade or so, the construction of SDI has proliferated geographically across all levels. It ranges from the National SDI in the U.S. to both the local SDI, such as state SDI and county SDI, and Global SDI. In the U.S., building SDI has involved almost every department of the federal government. Large volumes of geographic data, which are valuable to various organizations, have been accumulated mostly in a traditional, hierarchical manner: objects and their related attributes are collected and classified according to different themes or layers, and different layers are overlain to produce a specific map. To fully utilize the available spatial data efficiently and effectively, GIS has to play a critical role, not just in disseminating raw data, but also in providing information and offering value-added services to potential users.

However, to utilize and access valuable data, GIS-enabled environments have to be available to the public. The fast development of the Internet, especially the World Wide Web (WWW) and wireless communication, provides an ideal platform to empower the general public with the GIS technology through WebGIS and Location Based Service (LBS). The geospatial enablement of everyday tools (e.g., cars and phones) has provided the general public channels to access GIS environments almost anywhere and anytime. These developments, facilitated by the general advancement of computing technology, permit data and information sharing through SDI and different types of distributed systems. In all diverse systems, the common vital units are the computing components, which handle the access, processing and visualization of the geographic information, and the interactions between the users and the data. Therefore, a distributed GIS may be abstractly organized into different computing units, which are themselves connected through various types of networks (e.g., coaxial cable, optical fiber and satellite), and may be represented by the client/server computing model suggested by many scholars. According to different roles, a typical system broadly consists of three parts: a client, a server and a network. The client interacts with the users and performs some computing functions on spatial data. The server supplies data and information, and performs some value-added services to a client. The network hosts the transmission of information between the client and server.

Among various types of network GIS, including the LBS, WebGIS is extensively developed and widely used. It has accompanied the rapid development of the WWW during the past decade. Most users of the Internet have experience using WebGIS. Mapquest, Terraserver, Weather.com, and many other WebGISs have been widely used in, for example, online route selection, city planning, environmental exploration, watersheds management, land use planning, road/rail construction, business analysis, airport construction, and data integration and dissemination. These popular tools serve different types of users. To give the user a better view of data or information, 3D visualization, Virtual Reality Markup Language (VRML), and multimedia have also been integrated into certain WebGISs.

While WebGIS is gaining in popularity, dissemination of voluminous and heterogeneous data becomes a challenge, as the Internet bandwidth is not limitless. To handle this challenge, two important issues can be considered: (1) share and interoperate the heterogeneous data among different systems, different communities, and different users; and (2) improve the system performance so that data are delivered to the users within a reasonable time span. The OpenGIS Consortium (OGC) and Technical Committee 211 of International Organization of Standards address the first issue by providing a series of standardized interface specifications to allow different components of the system, including data, to support interoperability. Although the second issue has been addressed by various proposed suggestions, the research on performance of WebGIS has limitations on two issues: (1) most methods focus on only one aspect of the performance problem; and (2) most methods do not consider how the hierarchical structure of map, layer, object and attribute may affect performance.

WebGIS focuses on how to allocate both raster and vector data in a client-server-based web platform, as well as how to allocate functions to different system components in processing data to satisfy users' needs.

Raster Data

To handle raster data transmission, useful solutions may be borrowed from research and applications in image transmission in computer science. For instance, a progressive raster transmission technique has been frequently suggested. The basic idea of progressive transmission is to use image compression techniques to gradually extract and transmit raster data. After the compressed image is transmitted to the client, the image is gradually reconstructed on the client side. A simple progressive raster transmission technique randomly extracts and transmits the image without following a systematic algorithmic process. More sophisticated techniques for progressive raster transmission could be based on image compression techniques, such as Joint Photographic Experts Group (JPEG), wavelet, fractal, or a combination of techniques. Because of their complexity and their computing requirements, the progressive techniques are ideal for transmitting fixed-size images on the Internet. But, they do not have the flexibility to handle efficiently the transmission of large volume and variable image sizes in a WebGIS environment. However, the fundamental techniques of image compression may still be used to reduce the overall image transmission size.

A relatively large image may be extracted into different levels of detail to construct a hierarchical or pyramid structure. In each hierarchical layer, the image may be cut into pieces or tiles, which are logically connected through their respective coordinates. The image data may be transmitted in a load-on-demand manner (i.e., only the data of interest, as requested by the user), combined from the respective tiles and transmitted to the client side. TerraServer (available from the United States Geological Survey of Reston, Va.) uses this technique to assist SQL Server to manage images, but this approach is not applicable for managing pyramid in WebGIS, as most WebGIS cannot come with SQL Server. ArcGIS (available from ESRI of Redlands, Calif.) also adopts the pyramid technique in handling big images, but the pyramid is built every time the big image is accessed. This temporary approach is not suitable for managing images in WebGIS because the response time will be too long if the pyramid is built for every access. Therefore, elaborate permanent pyramid-management strategies need to be developed.

Some scholars suggest adopting tile pre-fetching and caching techniques to improve the performance on raster data transmissions. Unfortunately, this combined technique is effective for raster data only, and the complex nature of WebGIS involves the handling of both raster data and vector data, as well as the support of spatial analysis. Moreover, users may request raster images in a relatively random manner and therefore, the pre-fetching technique may not be efficient and effective in handling random requests.

Vector Data

The progressive transmission technique can also be used for vector data, but the process is different from the one applied to raster data in the pyramid structure. Vector data may be extracted using cartographic principles to construct multilevel or multilayer structures, instead of using a simple resampling process for raster data. A mesh scheme may mark a milestone for vector progressive transmission. By slightly modifying the topology of the input mesh, a higher compression ratio for transmitting Triangulated Irregular Network (TIN) data can be achieved. Also, an encoding structure may improve the efficiency of progressive transmission. Further, a model to generate multiple map representations and a set of generalization operators may be used. These processes may be good for transmitting single-layer maps, performing atomic topological changes on a vector map to achieve a better transmission performance and preserving the topology of spatial data. However, these processes do not take into account the de facto hierarchical geographic data organization of maps, layers, objects, and attributes. Therefore, these processes cannot be used generically to handle heterogeneous datasets in a WebGIS environment.

Another technique for improving the performance of vector data transmission is indexing. Indexing techniques have been widely studied mainly from two perspectives: (1) spatial object, attribute-based thematic indexing; and (2) spatial indexing. Thematic indexing is the process of indexing attributes such as addresses, postcodes, phone numbers and feature names. Attribute data may be efficiently processed using popular commercial databases. An R-tree index method has also been used for thematic indexing. Spatial indexing may be more complex than thematic indexing and may be classified into two general categories: (1) hierarchical access indexing (such as R-tree and Quad-tree); and (2) hash indexing (such as Grid-files and R-files). R-tree may be based on a feature's Minimum Bounding Box, which can be the minimum rectangle containing the feature. There are several extensions of R-tree (such as R*-tree and R+-tree) that allow dynamic indexing. To support multilevel data structure, Reactive-tree, PR-file and Multiscale Hilbert R-tree have been proposed.

These spatial index and thematic index research efforts may provide a basis for implementing vector data indexing. The indexing techniques mentioned above may be used on either the client and/or server side to improve the access to vector data, and related computing techniques.

Other Computing Techniques

Some have used pre-fetching and caching techniques for raster data transmission in systems exclusively handling raster data. In a WebGIS, which may involve both raster and vector data, caching could be used not only for transmitting data, but also for allocating data between a client and a server, especially for metadata and fundamental layer information. Multithreading techniques have also been suggested to improve performance by processing more than one task simultaneously. This technique may be very useful for handling server-side concurrent access, as well as improving client side interactive capability. When a server is opened to the public, many users may access the server simultaneously. In this potential massive access situation, the system may also be required to adopt cluster techniques for multiple servers to serve users, ensure reliability and improve overall performance.

Consequently, what is needed are a system and method for efficiently handling the transmission of large volume and variable raster and vector sizes in a WebGIS environment. In addition, such system and method would take into consideration the hierarchical geographic data organization of maps, layers, objects, and attributes to improve overall performance. Furthermore, it is preferable to have fast transmission, good response time and reliability.

BRIEF DESCRIPTION OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

The present invention relates to a geographic information system. Specifically, the present invention is a set of techniques, which may be used together to improve system-wide performance of a geographic information system, such as a web-based GIS. Techniques include, for example, pyramid, cut and hash indexing; multithread and dynamic request, caching and binary compression. Pyramid, cut and hash indexing techniques can be used for managing large image datasets on the server side, while well-developed R-tree indexing techniques can be used for indexing vector data. Multithread and dynamic request techniques can be used for handling users' concurrent access, as well as client-side concurrent data requests. Caching techniques can be used for keeping some information on the client side based on the submitted dynamic requests. Binary compression techniques can be used to reduce the transmission volume of data.

Figure 1:
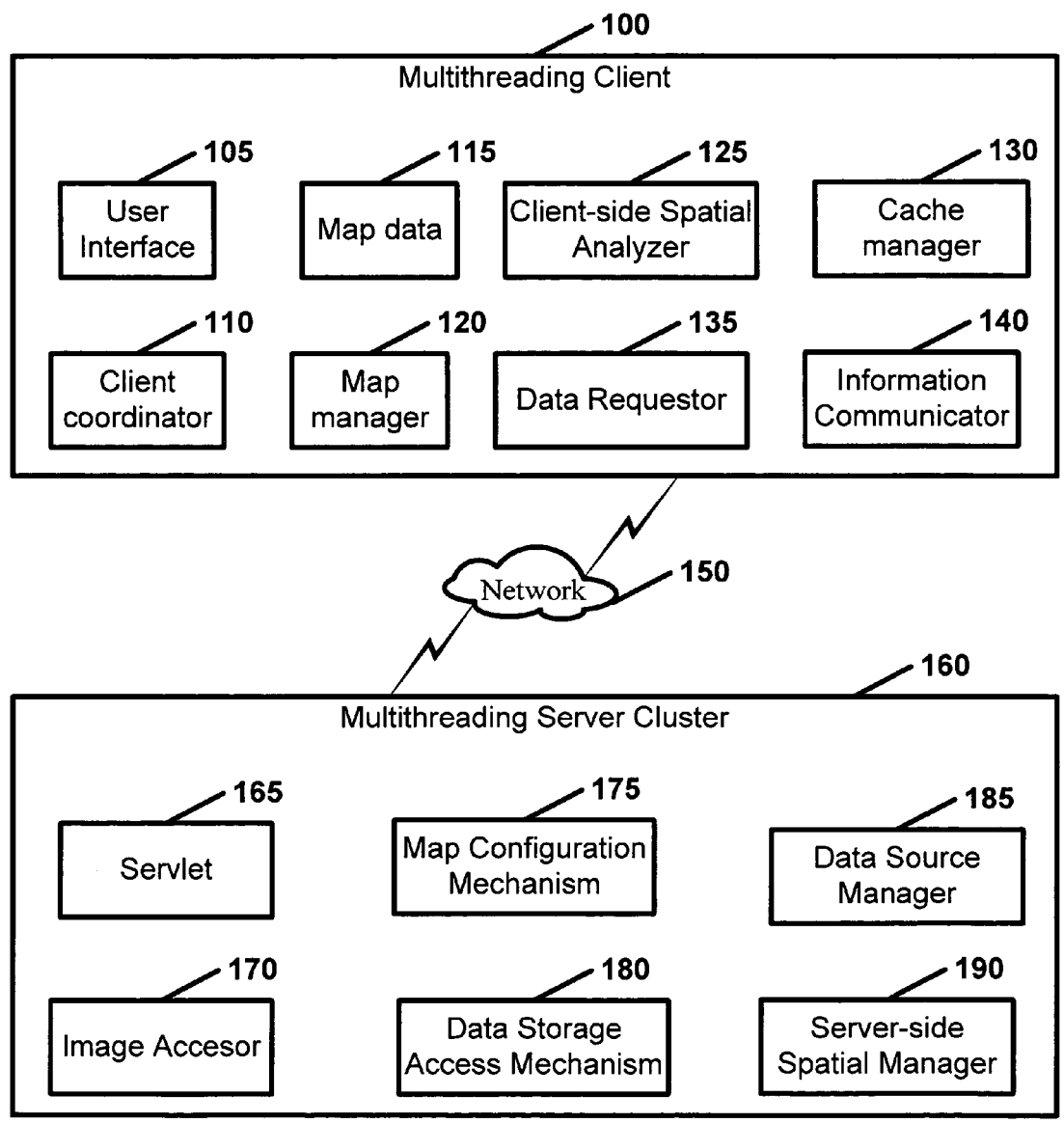
FIG. 1 shows one embodiment of a geographic information system.
Figure 2:
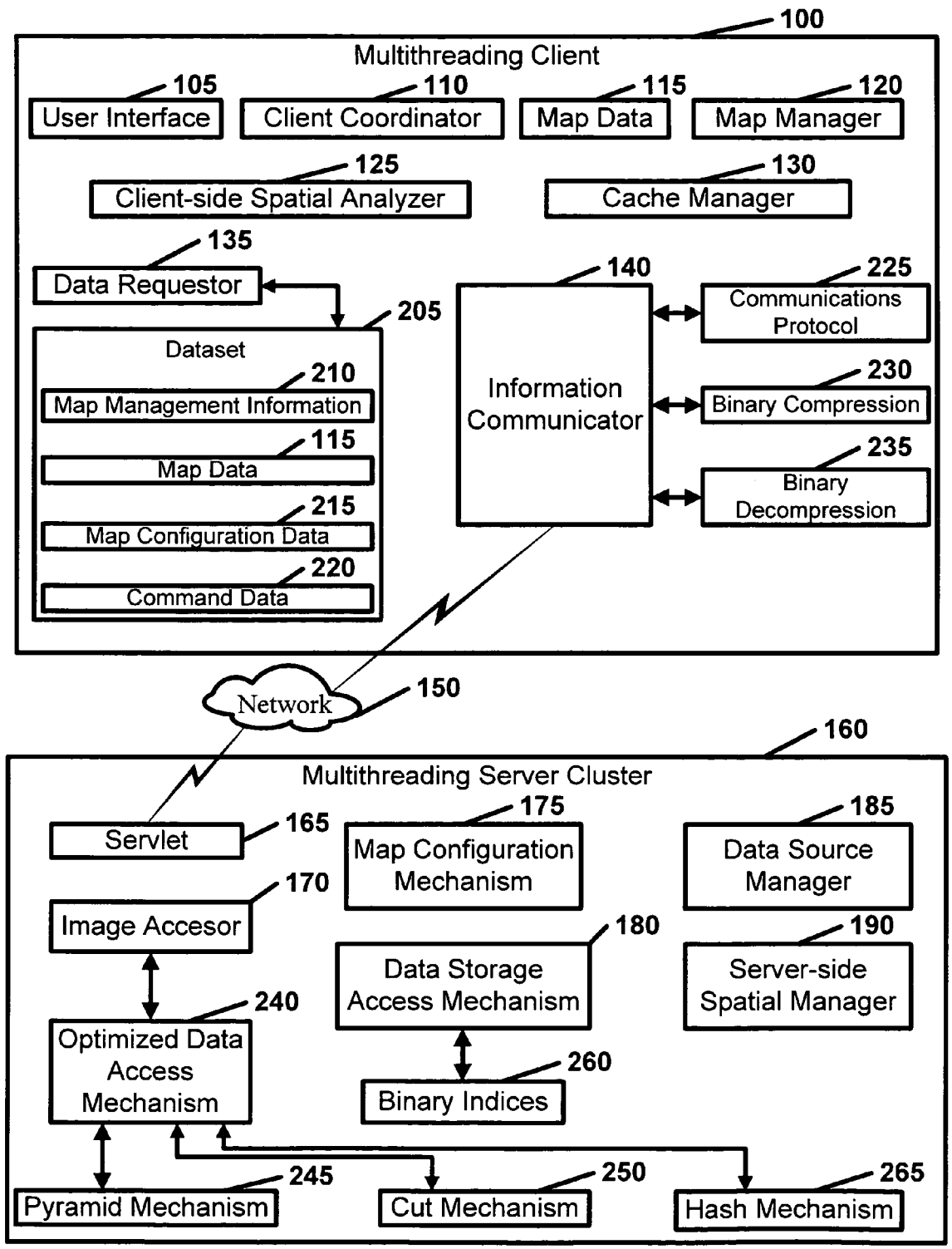
FIG. 2 shows another embodiment of a geographic information system.

Referring to FIGS. 1 and 2, a logical expression of the present invention may be seen. The present invention can have a multithreading client 100 and a multithreading server cluster 160. The multithreading client 100 may include a user interface 105, a client coordinator 110, map data 115, a map manager 120, a client-side spatial analyzer 125, a cache manager 130, a data requester 135, and an information communicator 140. Each of these components may operate independently or in conjunction with another. The user interface 105 may interact with a user. The client coordinator 110 may manage client functions based upon information received from a server and the user interface 105. With regards to map data 115, the map manager 120 may manage map data 115, whereas the client-side spatial analyzer 125 may process the map data 115. The cache manager 130 may manage cache resources. The data requester 135, as exemplified in FIG. 2, may request datasets 205, where each dataset 205 may include map management information 210, map data 115, map configuration data 215, and command data 220. Additionally, the data requester 135 may also interpret datasets 205. Map data 115 may include georeferenced data, such as vector data, raster data, and attributes. The information communicator 140, also as exemplified in FIG. 2, may use a predetermined communications protocol 225, a binary compressor 230, and a binary decompressor 235.

Similarly, the multithreading server cluster 160 may include a multitude of components, where each may operate independently or in conjunction with another. This cluster 160 may include at least one servlet 165, at least one image accessor 170, at least one map configuration mechanism 175, at least one data storage access mechanism 180, at least one data source manager 185, and at least one server-side spatial manager 190. Generally, the servlet 165 may communicate with the information coordinator 140 through a network 150, use the predetermined communications protocol 225, use the binary compressor 230, and use the binary decompressor 235. The network 150 can comprise the Internet, a wireless network or any network capable of using Internet protocols, such as TCP/IP and HTTP. The image accessor 170 may use an optimized data access mechanism 240. It is preferable that the optimized data access mechanism 240 uses a raster format. However, other formats, such as vector format, may be used. It is also preferable that the optimized data access mechanism 240 uses at least one of the following: a pyramid mechanism 245, a cut mechanism 250 and a hash mechanism 255. The data storage access mechanism 180 may use binary indices 260 for storing and retrieving data. The data source manager 185 may manage at least one of data storage access mechanism 180. The server-side spatial manager 190 may process the dataset 205.

Generally, the present invention may be implemented by using a multithreading client 100 and a multithreading server cluster 160. The multithreading client 100 may interact with a user; manage client functions with a client coordinator based upon information received from a server and the user interface; map map data; manage map data; process map data; manage cache resources; request and interpret a dataset 205; and use a predetermined communications protocol 225, a binary compressor 230 and a binary decompressor 235. The multithreading server cluster 160 may use a service that communicates with the information communicator through a network 150, uses the predetermined communications protocol 225, uses the binary compressor 230, and uses the binary decompressor 235; access images using an optimized data access mechanism 240; configure maps for making dynamic requests; use binary indices 260 for storing and retrieving data; manage stored data; and process a dataset 205.

The service may include, but is not limited to, a servlet, ISPAI or other types of web services. The dataset 205 may map management information, map map data, map configuration data, and/or map command data. The network 150 may include the Internet, a wireless network or a network that can use an Internet protocol, such as TCP/IP and HTTP. The optimized data access mechanism 240 may use a pyramid mechanism 245, a cut mechanism 250 and/or a hash mechanism 265.

The following sections provide a detailed description of each of these techniques and demonstrate how they may enhance the performance of a geographic information system. Although the present invention describes a web-based geographic information system, the present invention is not limited to only a web-based geographic information system. For example, the present invention may be used in non-network based applications.

A. Pyramid, Cut and Hash Indexing

On the client side of a WebGIS, hardware specifications may restrict the size of an image viewed by users. For example, modern desktops and laptops tend to use 1024×768 pixel or 1280×1024 pixel resolution with 15 to 21 inches of display, and MapQuest may even restrict the size to 500×500 pixels and 356×250 pixels for a better performance. It is almost always the case that the entire image is much larger in size than these restricted display sizes. For instance, if a dataset 205 is a one-meter resolution image of a county with an area of approximately 50 km×50 km, the image size would be approximately 50,000×50,000 pixels, which may not be displayable on an ordinary monitor. To provide a faster access to the different parts of the entire image from the restricted window size, the pyramid, cut and hash indexing techniques may be implemented.

A pyramid, which is a type of hierarchy, may be constructed by generating different abstraction levels of the original data through resampling. In general, resampling refers to a process of changing the size of an image (e.g., by cropping, zooming or distorting the image geometrically). For example, an image of 10,000×10,000 pixels may be generated by resampling the original 50,000×50,000 pixelized image based on a 5×5 pixel resampling scheme. By further resampling the reduced image based on a 5×5 pixel reduction, an image with only 2,000×2,000 pixels may be obtained. It tends to be faster to display and transmit this reduced 2,000×2,000 pixelized image for an overview of the original image than to process the original 50,000×50,000 pixels.

A pyramid may consist of multiscale replicated images of the original image. When a client requests data at a given scale level, the server will possibly search the required data from the level which has a scale closest to the requested scale, instead of searching the original high-resolution data. For example, suppose three images in the pyramid are in the scale of 1:100 k, 1:20 k, and 1:4 k, respectively, as in FIG. 14B. When the client requests an image of 1:25 k in scale, the server may then generate the requested image from the 1:20 k image instead of from the original 1:4 k image, which is 25-times larger. The use of the pyramid technique in this manner may reduce access time by extracting data from a smaller cartographic scale image already stored in the pyramid instead of the original image, especially when there is a large difference between the requested scale level and the original scale. When more detailed data may be needed or when it may be necessary to access the original image, a better access speed may be achieved by accessing the smaller piece of the original data, if the original data is cut into smaller pieces. In this circumstance, the restricted area on the image may be accessed. If the smaller pieces of the images are managed and accessed efficiently with effective strategies, the performance of the system will likely improve tremendously.

Figure 3:
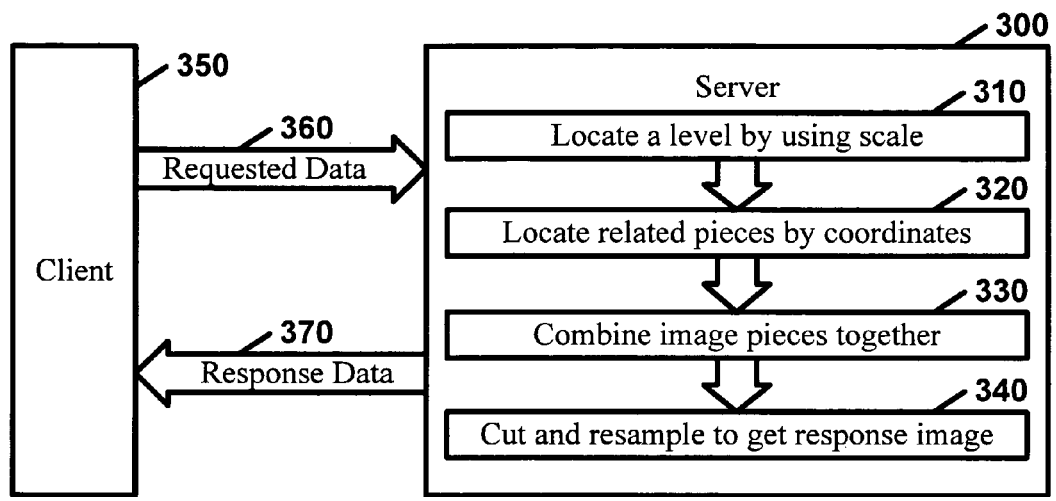
FIG. 3 shows a procedure for accessing data by using a pyramid and cut technique as per an aspect of an embodiment of the invention.

Implementation strategies for image cutting and pyramid construction tend to deal with three issues: (1) determining the size of cut pieces, (2) finding related pieces efficiently and (3) identifying a proper number of levels that should be used for constructing pyramid layers. To derive solutions to these issues, the procedure for accessing a pyramid may be critical. Given that a pyramid is built for an image, four steps are preferably involved in a client 350 accessing response data 370 in response to a request 360. Referring to FIG. 3, these steps may occur in the server 300. A first step 310 preferably determines the target level at which data may be extracted by comparing a requested scale with different scales already stored in the pyramid. A second step 320 preferably finds related pieces at the target level by using coordinate information. A third step 330 preferably combines these related pieces to form an image, which may have a spatial extent larger than the requested area. A fourth step 340 preferably cuts the combined image to match the requested area and, if necessary, resample the cut image to the requested scale level.

Figure 4:
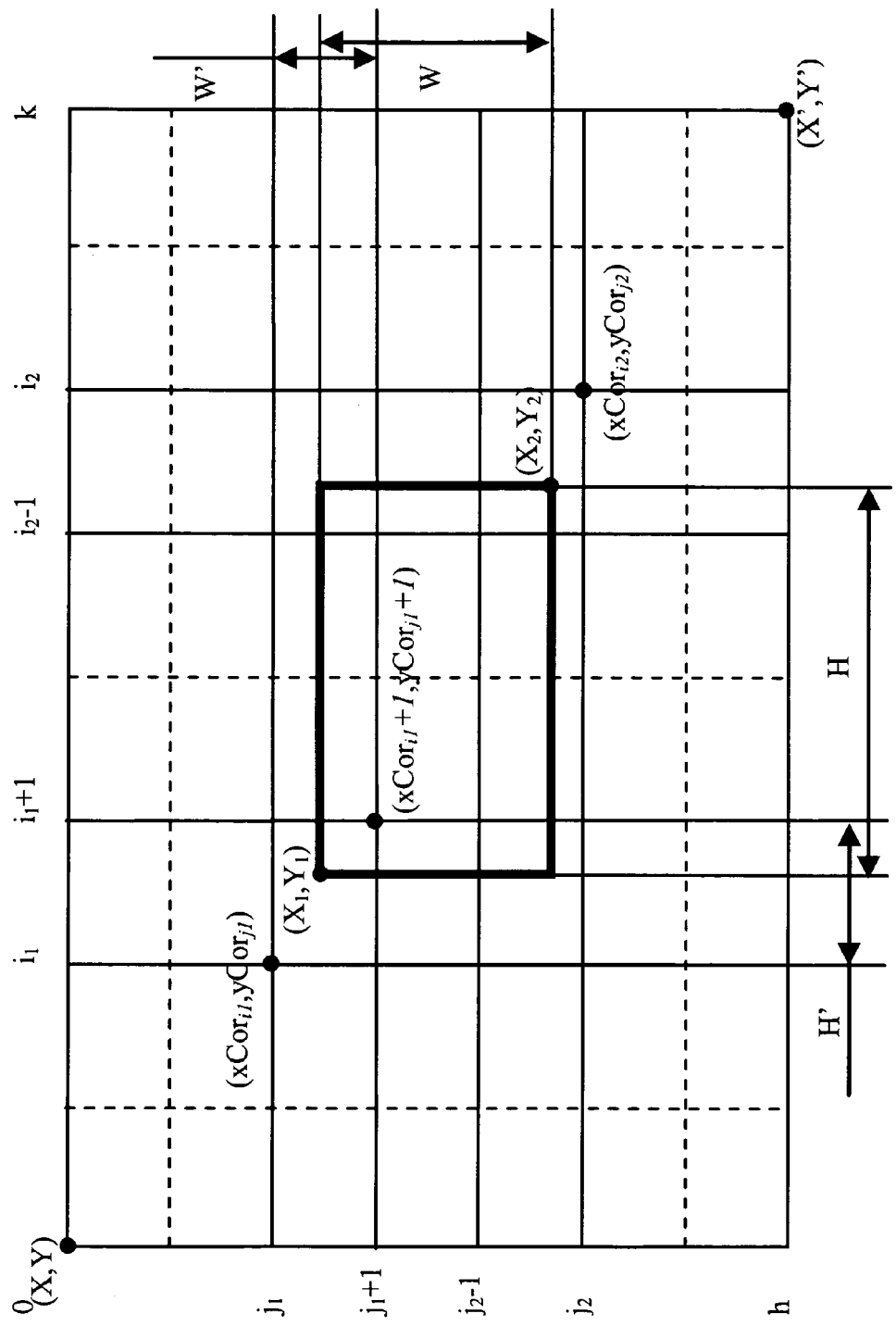
FIG. 4 illustrates an example of locating pieces from a pyramid level.

Suppose requested data 360 has dimensions H×W with scale S and is bounded by $(X_1, Y_1)$ and $(X_2, Y_2)$, as illustrated in FIG. 4. A pyramid may be constructed with a uniform distribution of scale levels (e.g., 1:1 M, 1:100 k, 1:10 k, 1:1 k, etc.). Each piece of the image has a dimension of H'×W'. The original image has a scale $S_0$ and is bounded by the coordinates (X, Y), (X', Y'). Suppose the pyramid has n levels, and let $S_i$ denote the scale at the ith level. Images at different scale levels in the pyramid may be arranged in a descending or ascending order. A first step in a data access procedure may be finding the appropriate level m with scale S. This step may be accomplished by a bisectional search procedure based on a descending or ascending order. It may be possible that no layer in the pyramid has the scale of exactly S, and therefore the goal should be to identify the two layers such that their scales are in the relation of $S_m < S < S_{m+1}$. In this case, the larger scale image may be used to provide a better display of the data.

In a second step, related pieces may be located by their coordinate information. It may be required to compare the coordinates of all pieces at level m in the pyramid with coordinates of the requested data 360. When the number of image pieces is not very large, the coordinates of all pieces may be evaluated, and thus the related pieces may be identified. However, when the number of pieces at each level becomes very large, searching through all pieces with every request from the clients 350 may be too time-consuming and unmanageable. A hash index technique, preferably capable of calculating an equation such as Equation 3 below, may be used to handle this problem.

Assume that the uniformly cut data pieces have the same dimension H'×W' and different coordinates $(xCor_{i1}, yCor_{j1})$ and $(xCor_{i1}+1, yCor_{j1}+1)$, where i and j are integers referring to the horizontal and vertical sequence of pieces, the maximum values of i and j in a certain level are k and h, respectively. Therefore, there are k×h pieces at a level, as illustrated in FIG. 4. Each of these pieces may be assigned a name, such as i-j.ext, where i and j refer to the location of the piece at the given level, and .ext, such as .jpg, .tiff and .bmp, etc., could define a specific graphic format. Therefore, the location of the piece and its coordinates may be coded into the name of the data file. The coordinates of each piece could be computed using a formula, such as Equation 1. Given the requested data 360 coordinates $(X_1, Y_1)$ and $(X_2, Y_2)$ in this example, a user may compute $(i_1, j_1)$ and $(i_2, j_2)$ according to Equation 3, which itself is derived from Equation 2. Equation 2 is the formal expression of identifying a spatial overlap condition. After deriving $(i_1, j_1)$ and $(i_2, j_2)$ from Equation 3, the results may be used to locate data pieces, which intersect with the requested area. These data pieces or files may be selected for future processing.

$$\begin{cases} xCor_{il} = X + (X' - X)/k \times i \\ yCor_{jl} = Y + (Y' - Y)/h \times j \\ xCor_{il+1} = X + (X' - X)/k \times (i+1) \\ yCor_{jl+1} = Y + (Y' - Y)/h \times (j+1) \\ i = 0, 1, 2, \ldots k - 1 \\ j = 0, 1, 2, \ldots h - 1 \end{cases} \quad \text{Equation 1}$$

$$\begin{cases} xCor_{i2+1} = X + (X' - X)/k \times (i_2 + 1) > X_2 > xCor_{i2} = \\ \quad X + (X' - X)/k \times i_2 \\ yCor_{j2+1} = Y + (Y' - Y)/h \times (j_2 + 1) > Y_2 > yCor_{j2} = \\ \quad Y + (Y' - Y)/h \times j_2 \\ xCor_{il} = X + (X' - X)/k \times i_1 < X_1 < xCor_{il+1} = \\ \quad X + (X' - X)/k \times (i_1 + 1) \\ yCor_{jl} = Y(Y' - Y)/h \times j_1 < Y_1 < yCor_{jl+1} = \\ \quad Y + (Y' - Y)/h \times (j_1 + 1) \end{cases} \quad \text{Equation 2}$$

$$\begin{cases} i_1 = \lfloor (X_1 - X) \times k / (X' - X) \rfloor \\ j_1 = \lfloor (Y_1 - Y) \times h / (Y' - Y) \rfloor \\ i_2 = \lceil (X_2 - X) \times k / (X' - X) \rceil \\ j_2 = \lceil (Y_2 - Y) \times h / (Y' - Y) \rceil \end{cases} \quad \text{Equation 3}$$

Instead of searching through the entire level and comparing each coordinate of the cut pieces, a user may find the required pieces directly from $i_1, j_1, i_2, j_2$ and the associated file names with Equation 3, which may serve as a hash function for locating appropriate pieces. After all required pieces are identified, a third step may include combining pieces to form an image. In a fourth step, the image may be cut according to a requested area. If necessary, resampling may also be required if the cut image does not have the same scale as the required data. The process of combining and cutting images may be performed efficiently with existing methods provided by many image-processing modules.

In the entire process, the most time-consuming components tend to be identifying an appropriate scale level and finding related pieces. The efficiency of these two processes may be improved tremendously by using bisection search and hash indexing as described above. The response time may then become a function of the number of pieces required and the scale difference between the combined piece and the required image. Ideally, data may be stored at any level the client 350 requests. However, infinite storage space to maintain data from all possible scale levels may not be available. Therefore, to achieve better performance, as well as a balance on storage capability and data volume, the cut pieces should have a dimension one to two times the size of the image or data display on the client side. In terms of the number of layers to be constructed in a pyramid, a scale ratio of 1:9 to extract layers to form the pyramid may achieve reasonable performance.

B. Cluster and Multithread

Figure 5:
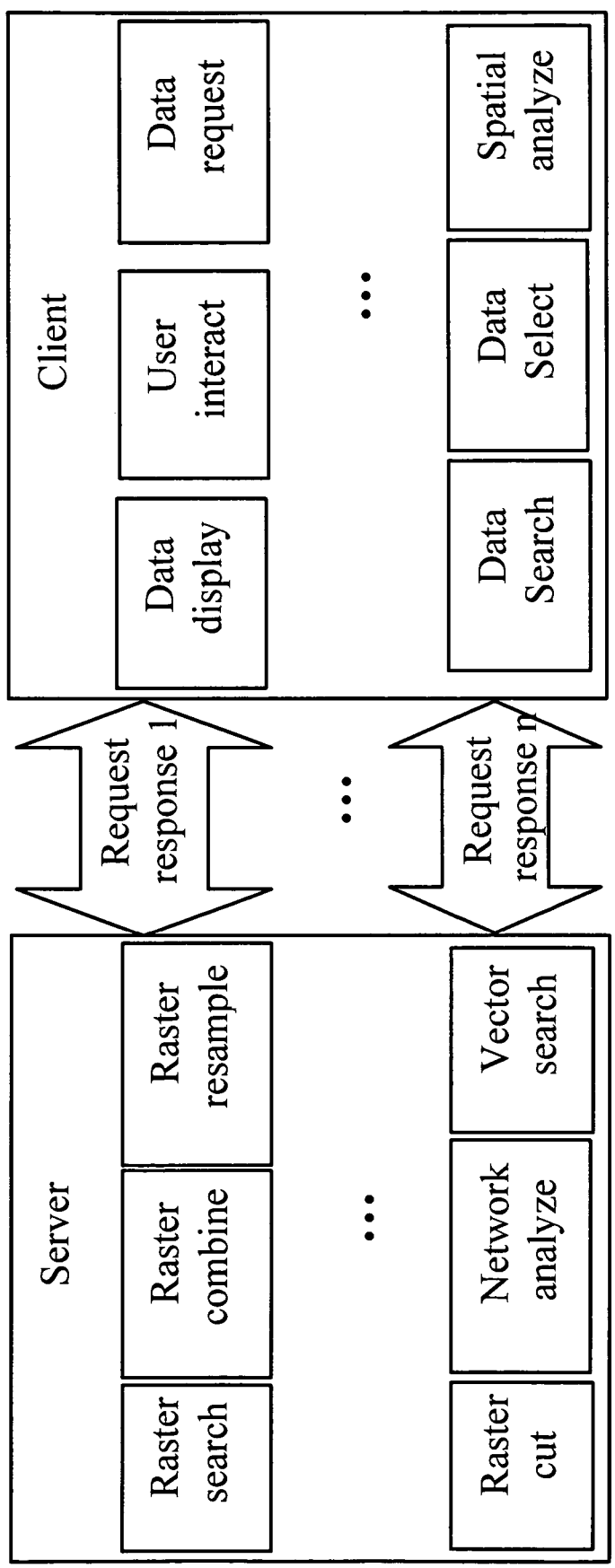
FIG. 5 illustrates processing functions between servers and clients in WebGIS.

Centralized or desktop GIS software include many complex functions. To implement and integrate these GIS functions in a distributed environment, Component Technologies, such as Common Object Request Broker Architecture (CORBA) (available from Object Management group of Needham, Mass.) and Component Object Model (COM) (available form Microsoft of Redman, Wash.), may be used. A WebGIS should provide an efficient environment for clients and servers to communicate intensively such that services requested by users may be completed within a reasonable time. The communication between servers and clients, and related GIS function components in each side of the network, may be seen in FIG. 5.

Traditionally, the procedure for processing a user's request involved multiple data layers taking the following steps. First, when the client receives a request from a user, the client may perform a spatial search on the client side to identify which spatial datasets are required. Second, within the selected data extent, a thorough search by data layer may be performed to check if the client side has the requested data layer cached. If the client side does have the data layer, then there is no need to fetch the data from the server. Third, if the client side does not have the requested data layer, the client may then submit a data request to the server, asking for the requested data. Fourth, the server may conduct a spatial search to locate data. Fifth, after identifying a data layer, the server may send data back to the client. Sixth, the system may return to the second step until all layers are found and transmitted. If a traditional single-thread process is adopted, a user cannot initiate a subsequent-layer-data request before former-layer data is received. If the request involves many searches and data layers, the process may become very time-consuming and may not be completed within a reasonable response time. This in turn may create great frustration for users. Furthermore, when many clients access the same server simultaneously, the sequential process described above may be too slow to respond adequately to requests from multiple clients. The increasing number of clients may rapidly reach a system bottleneck with any given system architecture.

Problems related to responding to requests from multiple clients may be handled more efficiently by using cluster and multithread techniques. A cluster may be defined as sets of systems connected with a redundant network interconnection. Multithread stems from a collection of more than one executed thread. A thread is generally an activity that is executed sequentially.

Figure 6A:
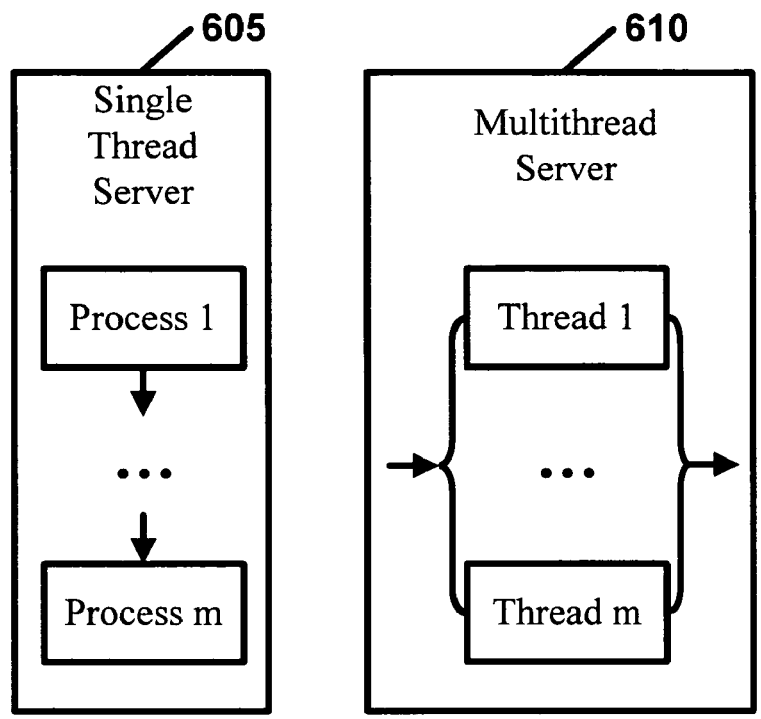
FIG. 6A illustrates a multithread server in WebGIS.

A major advantage of using a multithread technique is illustrated in FIG. 6A. If a single thread server 605 is used to process m processes, the time required to finish the entire process is $$\sum_{i=1}^{m} t_i,$$

where $t_i$ is the time required for process i. If a multithread server 610 is used, these m processes may be concurrently performed in m threads, and the time required to finishing all m processes may be $t=\max\{t_1, t_2, \ldots, t_m\}$.

Figure 6B:
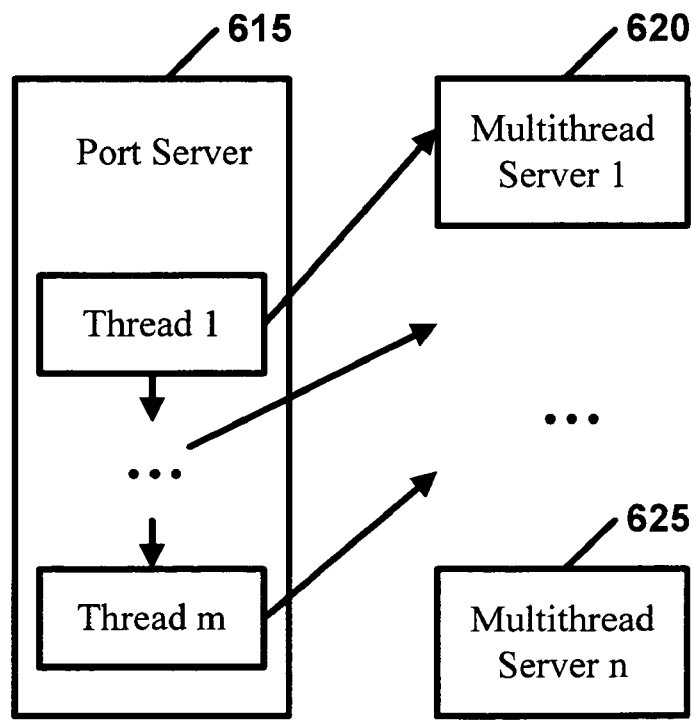
FIG. 6B illustrates a cluster in WebGIS.

Some computing processes, such as locating a disk, reading a file, numerical computation, transferring memory, etc., may be executed in different parts of a computer system. These different processes may be executed concurrently if different processes are not interlaced (i.e., different threads could be processed in a parallel fashion). But when client requests reach a certain level, the multithread technique may reach its limit. One option to avoid this problem is to increase the computing capability for that single server. However, this option may be dependent upon the current scientific and technological status of computing. Another viable option is to adopt a cluster technique, as illustrated in FIG. 6B.

Instead of using a single server, a cluster 160 may adopt multiple servers to support concurrent client accesses, which are distributed to different servers within a cluster 160. In addition, each server may use a multithread technique to process concurrent client requests, as illustrated in FIG. 6A. The National Geographic's Map Machine (available at http://plasma.nationalgeographic.com/mapmachine) is an example using this technique. When the client sends requests to the port server 615 connected to the Internet, it channels all the process requests and responses. The port server 615 may respond to more than one request at a time by allocating one thread to one request with multiple threads handling multiple requests. The port server 615 may redirect requests to another multithread server 620, 625 for processing when the first multithread server reaches its capacity. A WebGIS server is preferably equipped with flexible capacity to serve concurrent requests by using cluster and multithread system configurations on the server side. Given this system architecture, performance of WebGIS may be maintained or enhanced by upgrading the computers or adding a number of servers to meet the growth of concurrent accesses as needed. Therefore, this scalable solution may accommodate future growth.

On the client side, a user often issues a request that involves many processes and accesses, and they may be accomplished sequentially. However, some of these processes or accesses can be performed independently without affecting each other. The multithread technique may also be used to improve the performance on the client side. Given a request of "zoom in" to a 10-layer map, the request may invoke ten independent server accesses to the ten layers. These ten data access requests may be sent to the server at the same time through multithreading. As a result, using a multithreading technique may reduce access time to possibly ⅒th of the required sequential access time in this specific example. Therefore, the present invention may adopt multithreading techniques by sending requests for different layers simultaneously to the server.

C. Caching and Dynamic Data Request

Figure 7:
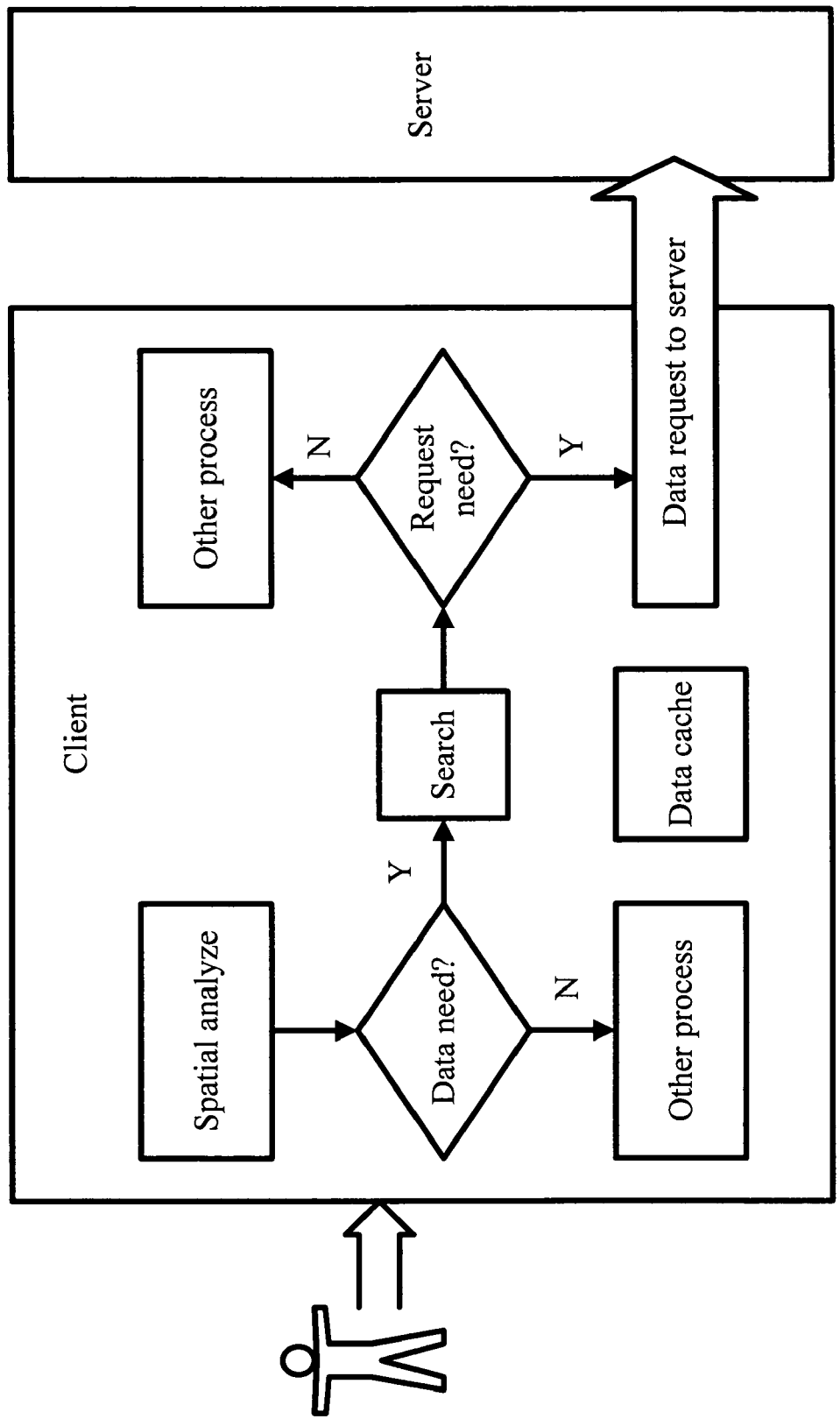
FIG. 7 illustrates cache and dynamic data request as per an aspect of an embodiment of the invention.

As illustrated in FIG. 7, when a request is issued, a WebGIS client may examine if requested data is on the client. If data is not on the client side, the data request may be sent to the server. If data is on the client side, access may be faster when compared to access across the Internet. Having some data residing temporarily on the client side may also meet the needs of subsequent data requests. Efficiency of data access may be increased by caching some data on the client side. Whenever data are needed, the client may first check if data is already available on the client side before sending a new request to the server. In a dynamic request and caching system, two issues need to be considered: (1) what content should be cached and (2) for how long?

Caching data on the client side may reduce the load on network transmission and server processing time, and thus improve the system's overall performance. Ideally, data is required to be sent only once if all data is duplicated on the client side. But this may be impossible because datasets may be too large to be completely cached on the client side. Therefore, based upon the user's interest or frequently accessed data as reflected by coordinates, spatial data defined by these coordinates may be cached for certain durations before they are replaced by other data which meet the more current needs of the user.

Frequently needed data should be cached to allow the system to respond as quickly as possible. Whether this technique is effective or not may largely depend on specific applications. In general, basic data layers with relatively small volume, such as the county boundary data for a state, should always be cached as a static layer and be loaded first and only once. Some frequently used data, which are larger in volume, such as district boundary data of the entire world, may be cached as needed. Some data, which are not frequently used and have a small volume, such as school data inside a county, may be cached once they are loaded. If a dataset 205 (which ought to be defined by the specific application environment) is not important and has a large volume, such as image background data, this data should not be cached. These scenarios are summarized in Table 1.

TABLE 1

Cache strategy at client side for different datasets

| Cache strategy | Use | Volume | Cache Architecture |
| --- | --- | --- | --- |
| Load at start-up and always cache | Frequent | Small | Static storage |
| Load once and always cache | Infrequent | Small | Semi-static cache |
| Load as needed and cache as needed | Frequent | Large | Dynamic cache |
| Load as needed but never cache | Infrequent | Large | No cache |

These caching scenarios may be implemented as options in a flexible function in the setup of a WebGIS. The system administrator or developer may customize the caching strategies based upon data volume and characteristics of data in specific applications.

When many users access the system concurrently, the system may also cache certain frequently accessed data in the random access memory (RAM) on the server side to reduce data access time from permanent devices every time a data request is received. The first two strategies in Table 1 may also be used for server side caching. The third strategy may also be used, but may require intelligent management of server caching processes.

D. Binary Format and Compression

The volume of transmitted data on the network 150 may affect the performance of a distributed system. GIS data may be in raster or vector data formats according to a traditional classification scheme. OGC has suggested a set of standards for transmitting images in its Web Mapping Testbed (WMT). In the WMT specification, OGC allows developers to decide which format to use for raster data. Users have many options, including various compression technologies, such as .gif and .jpg file formats, for raster data. OGC has also proposed the Geography Markup Language (GML) for the transmission of vector data on a network. GML is a milestone for the interoperability of feature-based GIS data because it may explicitly represent geographical data by using tags to mark objects and related information. But its performance is rather inferior because data volume may increase by two-fold to three-fold whenever GML is used.

In general, the two de facto data transmission formats are text based and binary based. The transmission of compressed data may be regarded as an additional method. A user may take GML3.0 as a text-based data format, and the shapefile as a binary-based format. Shapefile is a vector data file format used by ESRI primarily for its ArcView software package. Data in a shapefile tends to be organized by records, each of which represents an object or feature in a GIS data layer or theme. All vector coordinate data may be stored as binary data in a .shp file. One may use a relative-value-compression method to compress the binary shapefile to generate a compressed data format.

The relative-value-compression method is generally based on the principle that vector data may be stored as points, and consecutive points may have minor differences in coordinates. The basic idea for this type of compression is to keep the first point's coordinate, and store differences of other points' coordinates from their previous point's coordinates. The decompression process may be reversed by taking the first point's coordinates and get others by adding the difference to their previous points' coordinates.

Figure 8:
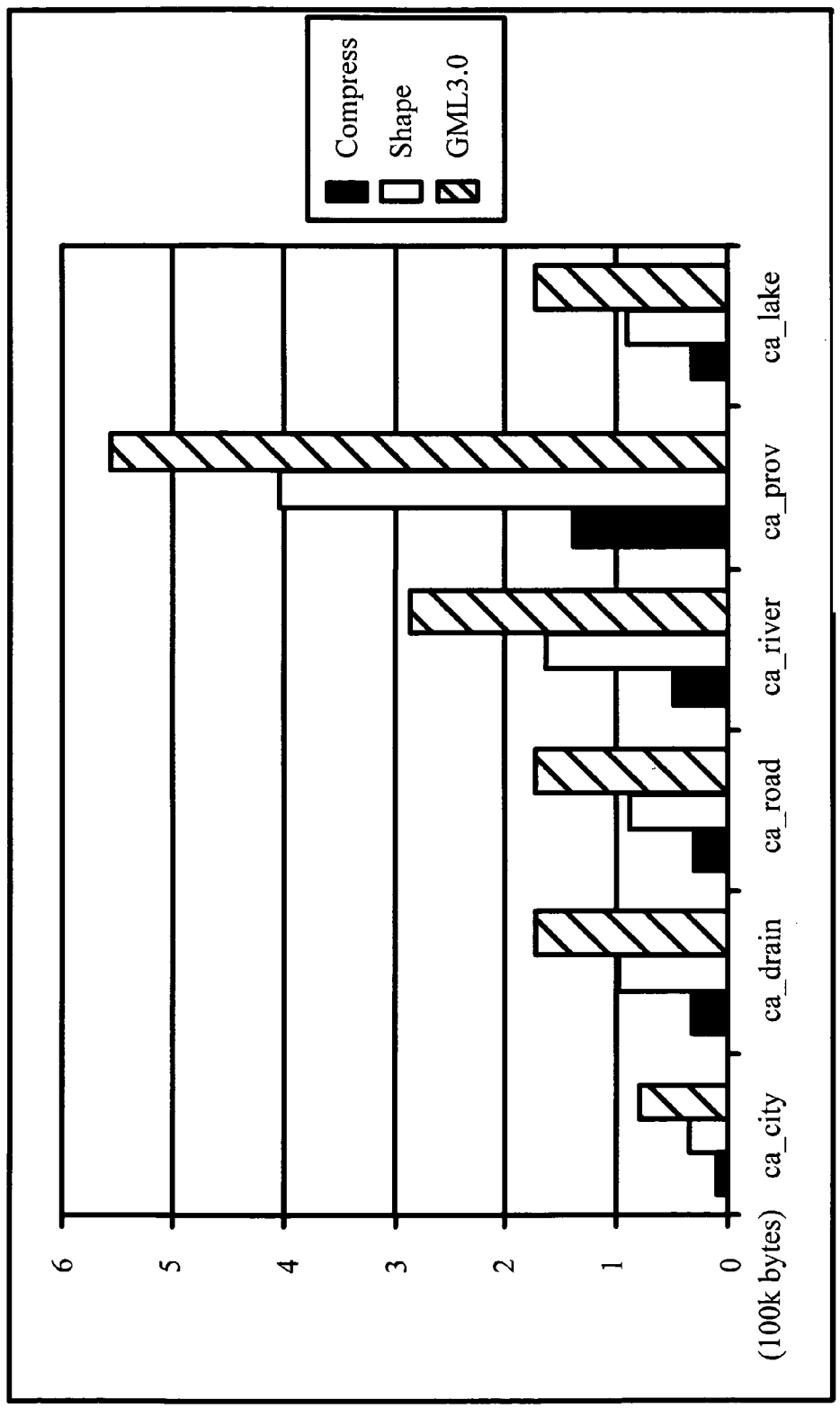
FIG. 8 shows results of a set of datasets chosen to compare the data volume of three different data storage and transmission methods.

A set of datasets 205, which include points, lines and polygons, may be randomly chosen to compare data volume of these three different data storage and transmission methods. The results are shown in FIG. 8. The volume of the compressed format is the smallest as expected. Therefore, it may be ideal and logical to use the compressed format to reduce the transmission volume over the Internet. The compression component may be implemented on the server side, whereas the decompression component may be implemented on the client side.

E. Performance Comparison

Figure 9:
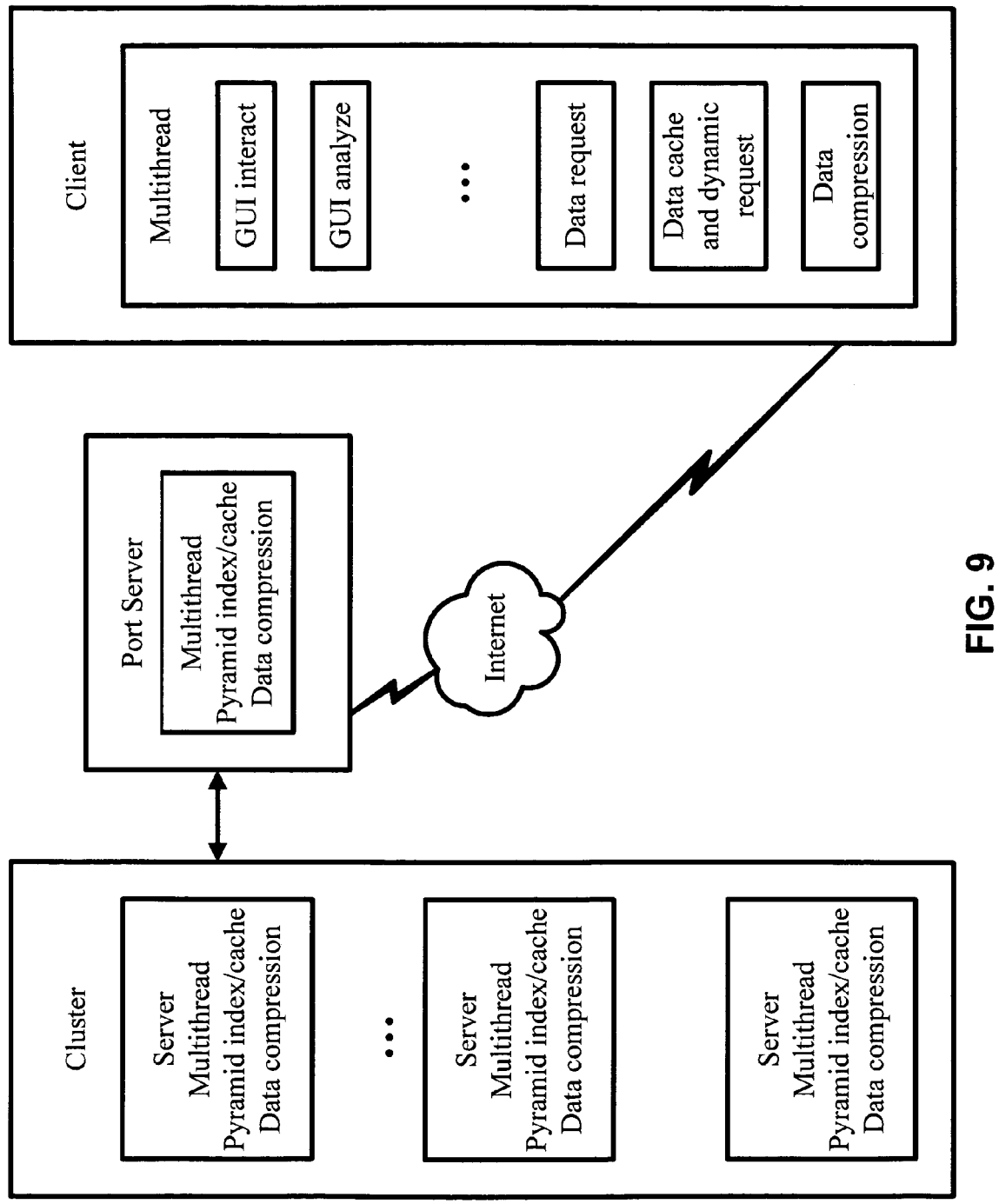
FIG. 9 illustrates a performance improving architecture of WebGIS as per an aspect of an embodiment of the invention.

When various performance-improving techniques are adopted, the simple client-server distributed architecture may be modified to a relatively complex architecture, an example of which is illustrated in FIG. 9. In this modified and improved architecture, the cache, dynamic data request and multithread techniques may be implemented on the client side. The multithread, cache, pyramid and cluster techniques may be implemented on the server side. A data compression technique that compresses at a server and decompresses at a client may be adopted to reduce data volume for transmission. Table 2 highlights techniques, problems addressed and implementation locations.

TABLE 2

Performance improving techniques

| Techniques | Problem addressed | Implementation |
| --- | --- | --- |
| Pyramid, Cut, Hash index | Big image manage and publish | Server |
| Cache | Client user interact time and server data access time | Client/Server |
| Dynamic request | Client user data access time | Client |
| Cluster | Concurrent user access conflict | Server |
| Multithread | Concurrent user access and client user interact | Server/Client |
| Binary Index | Handle large Vector Datasets | Server |
| Binary compression | Network transmission load: Compress at Server and decompress at client | Server/Client |

Figure 10:
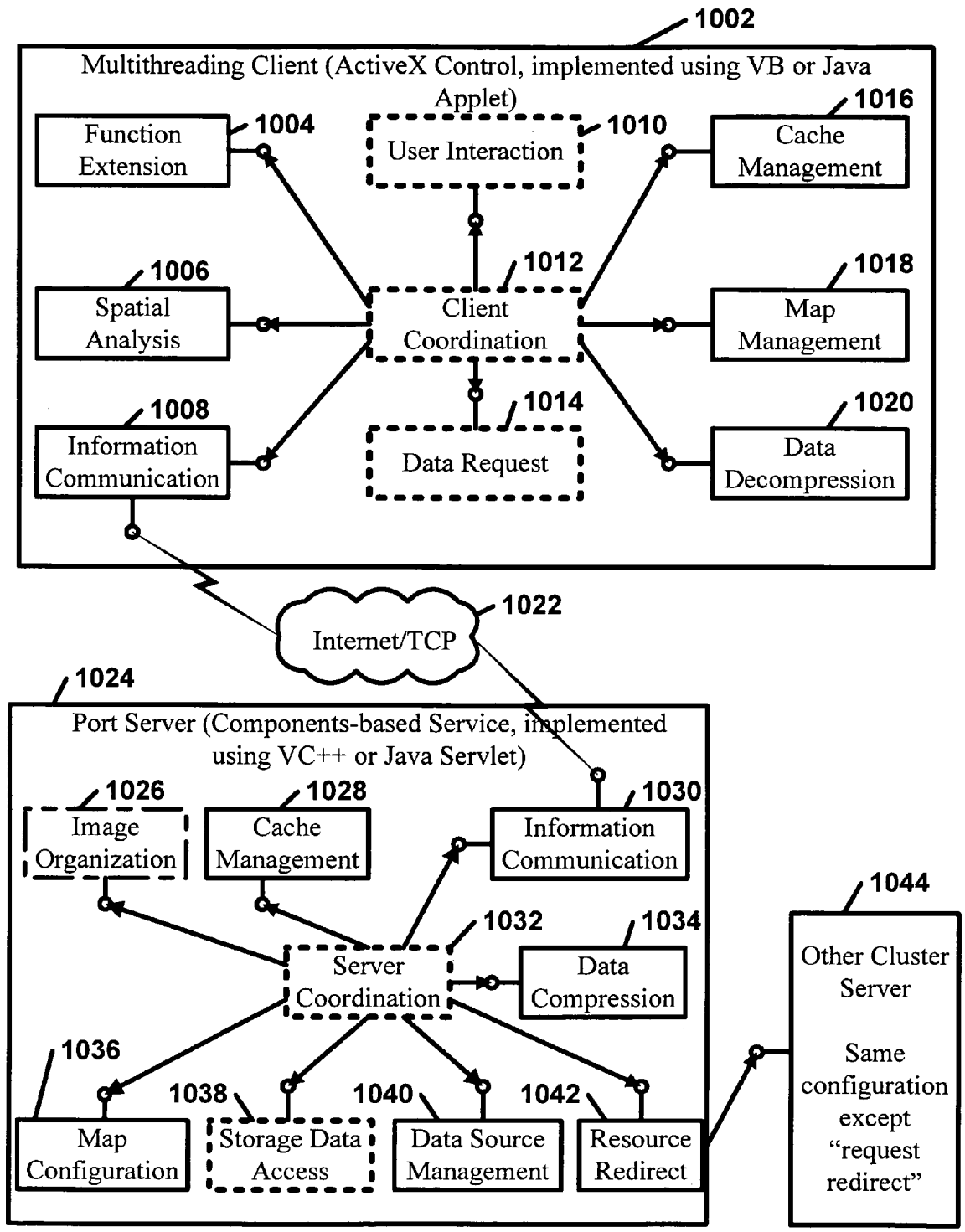
FIG. 10 illustrates an architectural overview of CyberGIS as per an aspect of an embodiment of the invention.

This relatively complex architecture may be used in developing a WebGIS prototype (hereinafter referred to as CyberGIS). A version of CyberGIS, a COM-based software, was developed using Visual Basic (VB) and Visual C++ (VC++). The performance of this WebGIS software may be significantly improved using the relatively complex architecture. FIG. 10 shows a windows-based architecture that may be used for developing CyberGIS, where a client 1002 is an ActiveX control built using Visual Basic (VB), and where a server 1024 is a COM-based windows service built using Visual C++ (VC++). Although the shown client 1002 is implemented in VB and the shown server 1024 is implemented in VC++, the present invention is not limited to these programs. For example, another implementation is based on Java technology and includes Java applets, Java servlet, etc. Each rectangle with small circle/line pairs attached (1004, 1006, 1008, 1010, 1014, 1016, 1018, 1020, 1026, 1028, 1030, 1034, 1036, 1038, 1040, 1042, and 1044) is a component or ActiveX control. The small circles denote interfaces that enable components to be called by other components. An arrow line denotes an interface-call relationship. User Interaction 1010, Client Coordination 1012 and Data Request 1014 on the client side 1002 may adopt a multithread technique to ensure user interaction and data request parallelization. Client Coordination 1012 may also control a Cache, Data Decompression and dynamic data requests in the Map Management 1018. On the server side 1024, Image Organization 1026 may adopt the pyramid/cut/hash-index technique. Server Coordination 1032 and Storage Data Access 1038 may be multithread-enabled to ensure fast responses for concurrent users. The server 1024 may also adopt a cluster technique to facilitate concurrent massive access.

Figure 11:
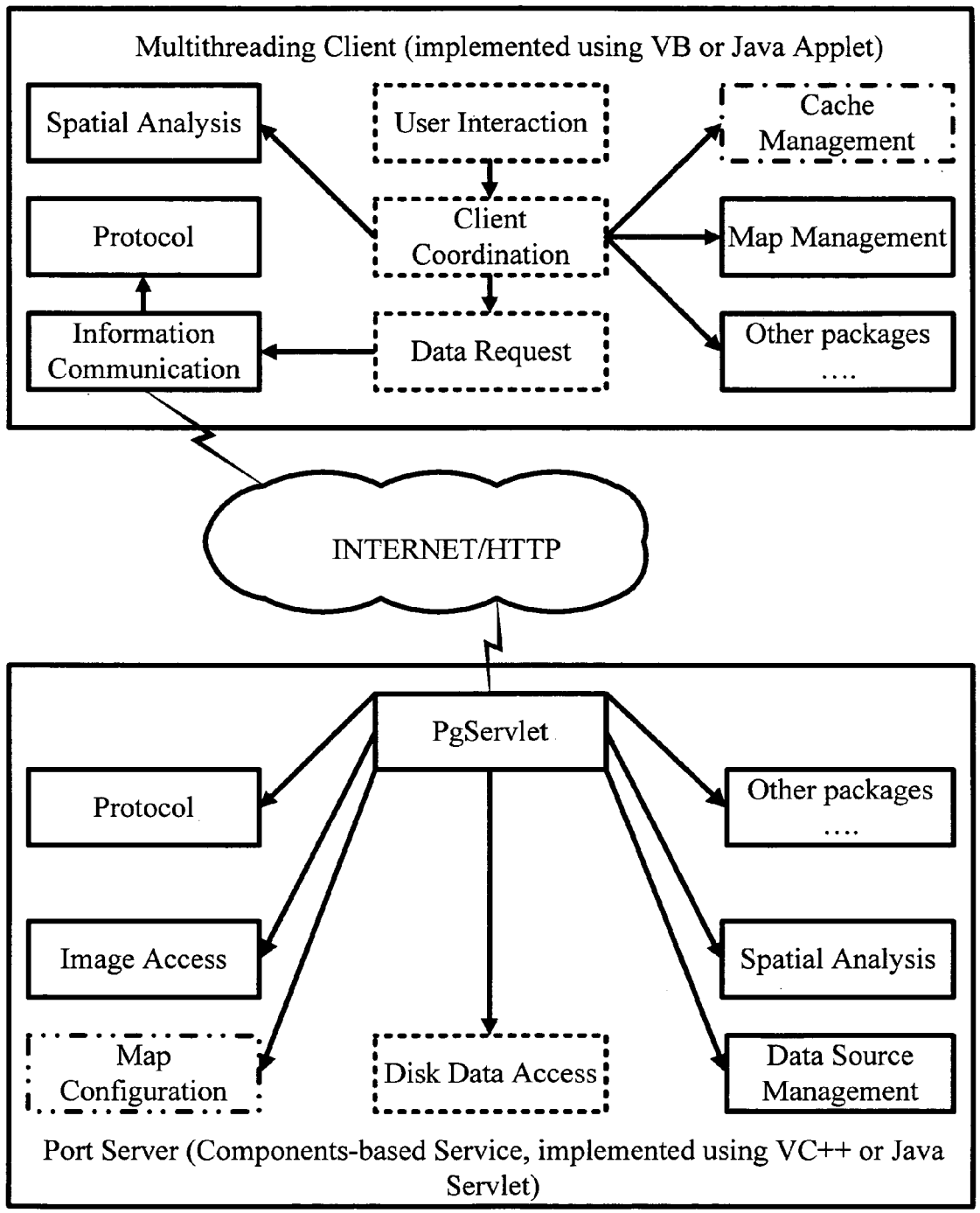
FIG. 11 shows another architectural overview of CyberGIS as per an aspect of an embodiment of the invention.

Like FIG. 10, FIG. 11, illustrates another embodiment of an architectural overview of CyberGIS. Yet, FIG. 11 captures the present invention in a non-Windows platform, such as UNIX. Still, implementable programs may include those similar to that of FIG. 10.

Figure 12A:
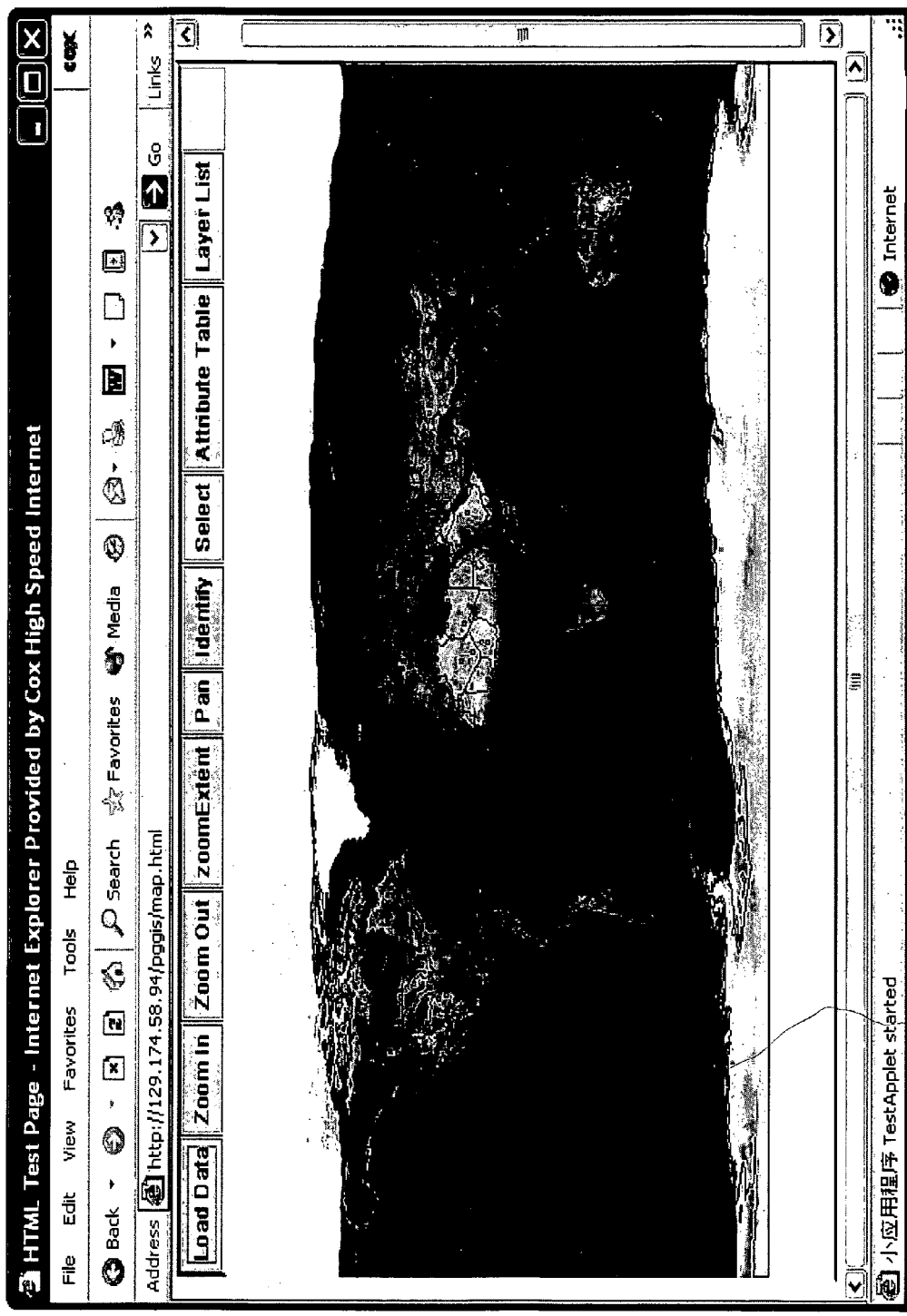
FIG. 12A shows an example of a client GUI implementing a Java visual interface as per an aspect of an embodiment of the invention.
Figure 12B:
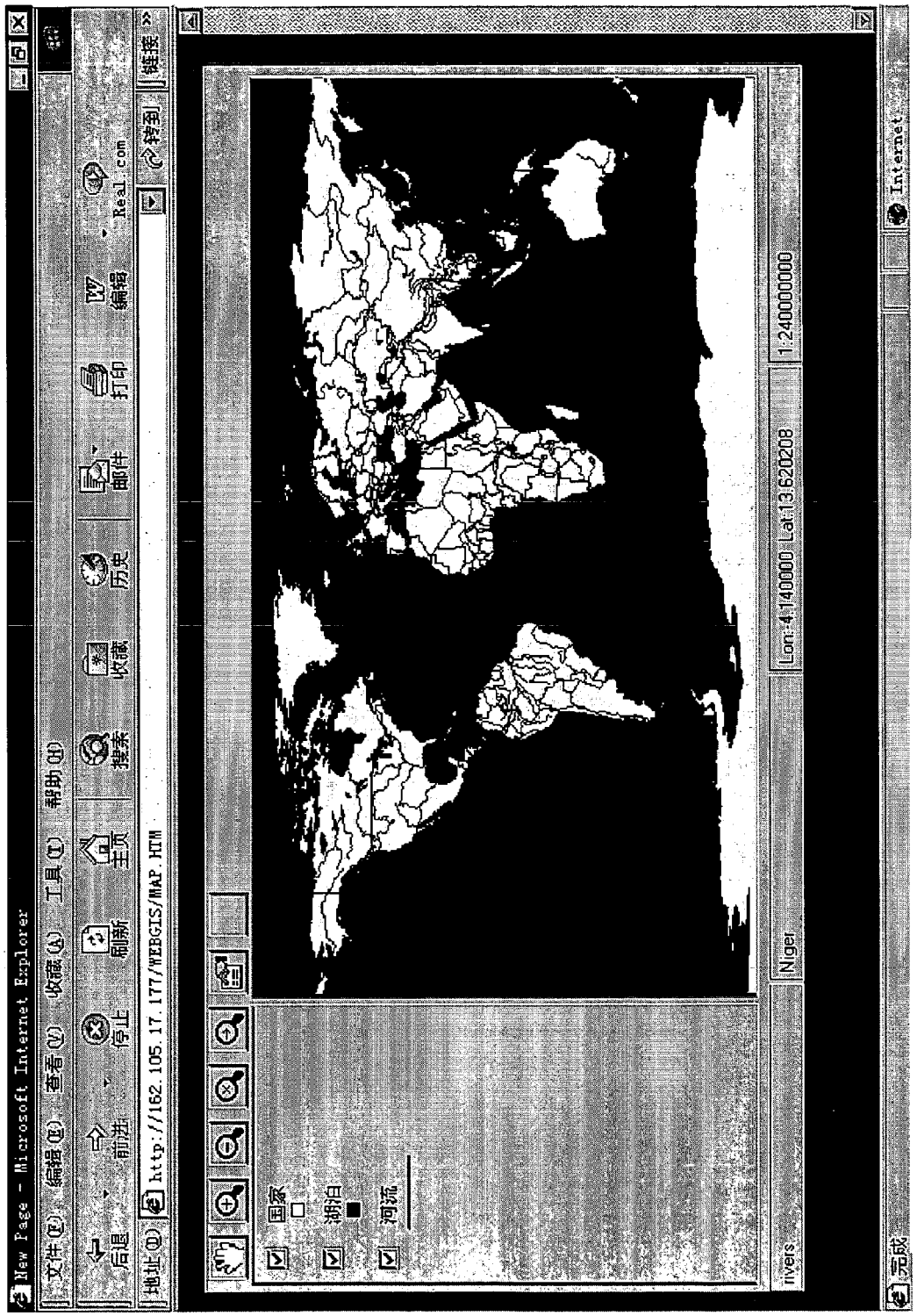
FIG. 12B shows an example of a client GUI implementing a VB-based ActiveX Control interface as per an aspect of an embodiment of the invention.

An example of a client GUI of CyberGIS may be seen in FIGS. 12A and 12B. Both show a snapshot of a world map displaying countries and some bodies of water (e.g., oceans, seas, lakes and rivers). FIG. 12A is an example implementing a Java visual interface; FIG. 12B is an example implementing a VB-based ActiveX Control interface.

In this section, the performance of CyberGIS may be compared in operation with and without different techniques, including large image handling, client multilayer accessing, client caching, two-computer clustering and multiuser concurrent accessing. One may use the same server and client configurations in the comparison. A test server may have the following configuration: 1.7 GHz Pentium 4 CPU, 1 Gb RAM, and 7200 RPM hard disk. A test client configuration may have the following parameters: 1.0 GHz Pentium III CPU, 256 Mb RAM. The network speed was approximately 10 Mbps.

1. Large Image Handling

Figure 13:
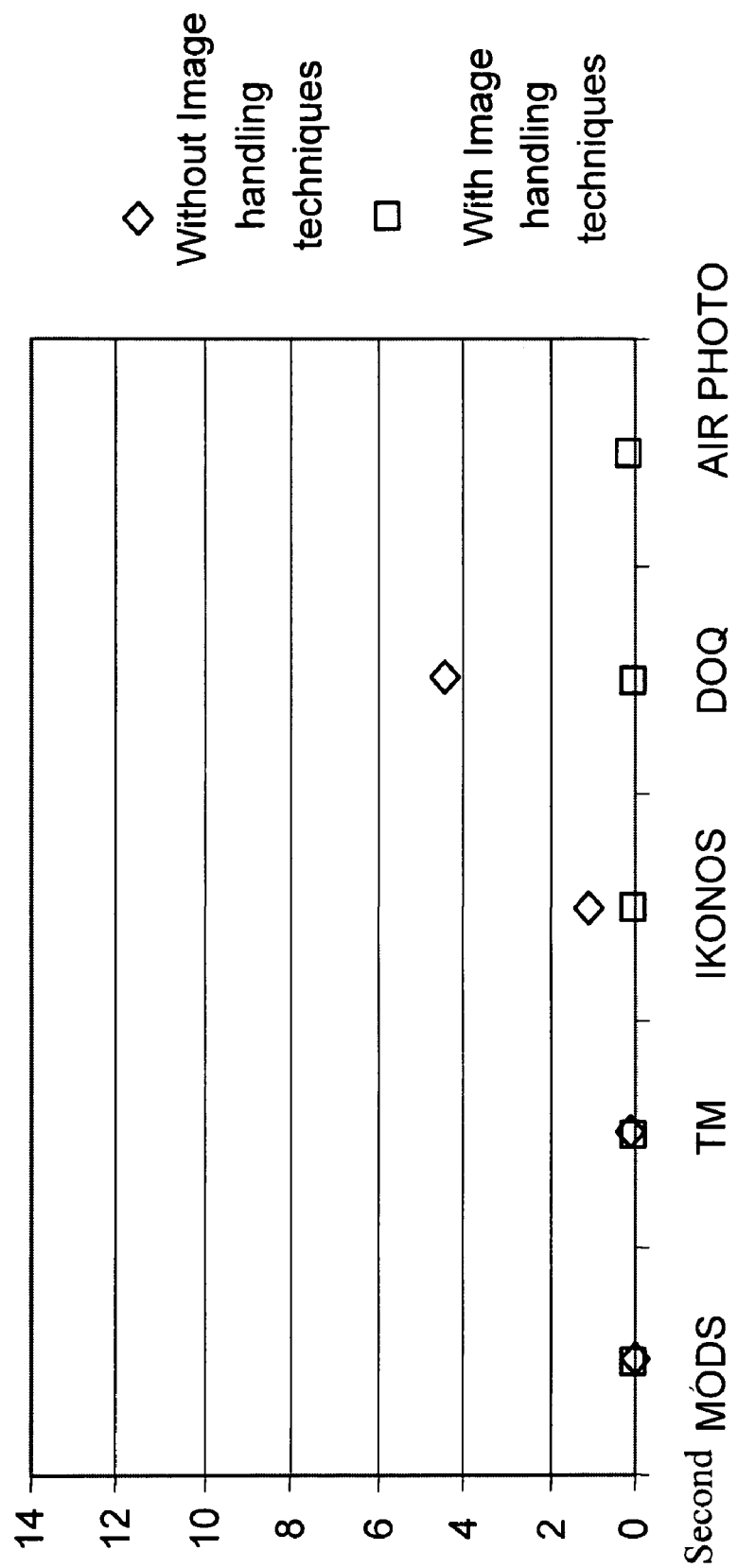
FIG. 13 illustrates response times for handling different images of different data volume with or without image handling techniques.

Different types of image data with different sizes may be used in the comparison. Data may include, for example, 100 kbyte Moderate Resolution Imaging Spectroradiometer data (MODIS), 2.4 Mbyte Landsat Thematic Mapper data (TM), 79.3 Mbyte IKONOS data, 329 Mbyte Digital Orthophoto Quadrangles data (DOQ) and 1.2 Gbyte airborne photos. Data may be organized in two different ways: (1) single image and (2) the pyramid, hash-index, cut organization. The response time of the two different data organizations may be recorded for accessing different images. As illustrated in FIG. 13, the second method may outperform the first one as the size of the data becomes larger. In fact, the response time of the second method in handling all images may be relatively constant for different images. Even with the 1.2 Gbyte aerial photo data, the performance of the second method might not change much. The first method may have difficulty in handling the big image (i.e., the air photo) within a reasonable time. Therefore, FIG. 13 does not show the result of using the first method for the air photo. Apparently, the performance of the second method may be relatively independent of the data size, while the performance of the first method may be inversely related to the size of data.

2. Multilayer Data Accessing

Figure 14A:
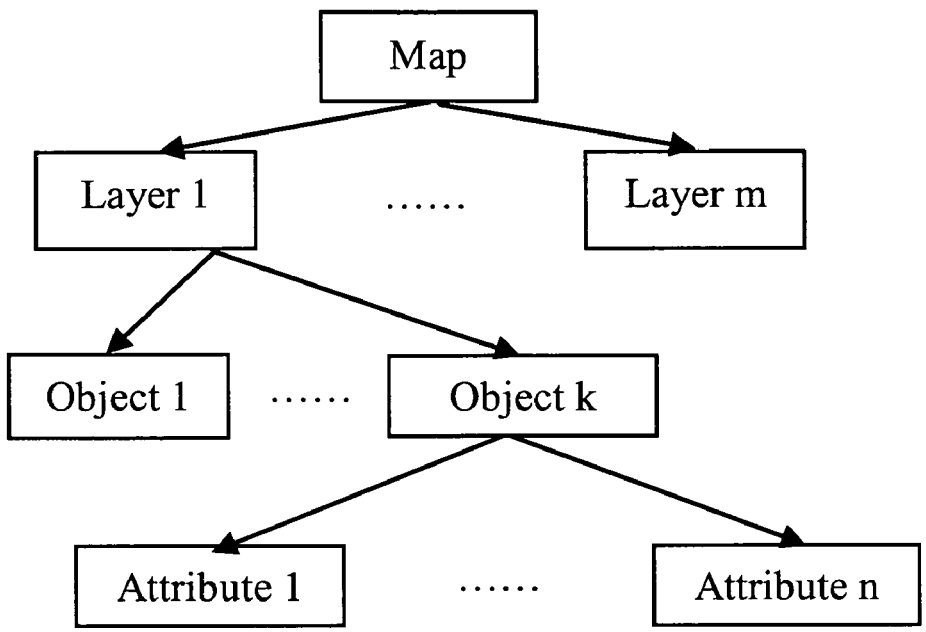
FIG. 14A illustrates a hierarchical organization of geographic data.
Figure 14B:
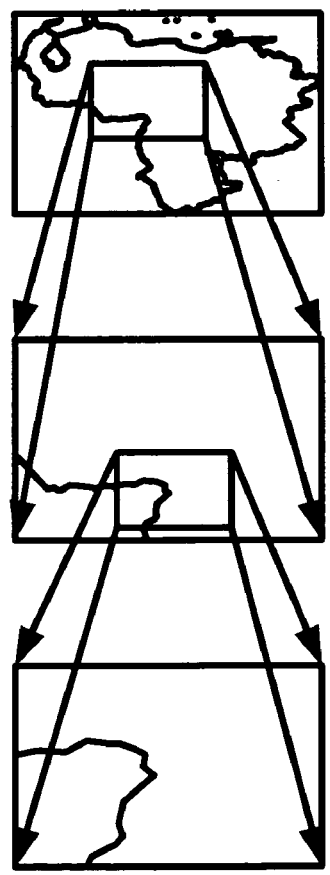
FIG. 14B illustrates a pyramid structure of image data.
Figure 15:
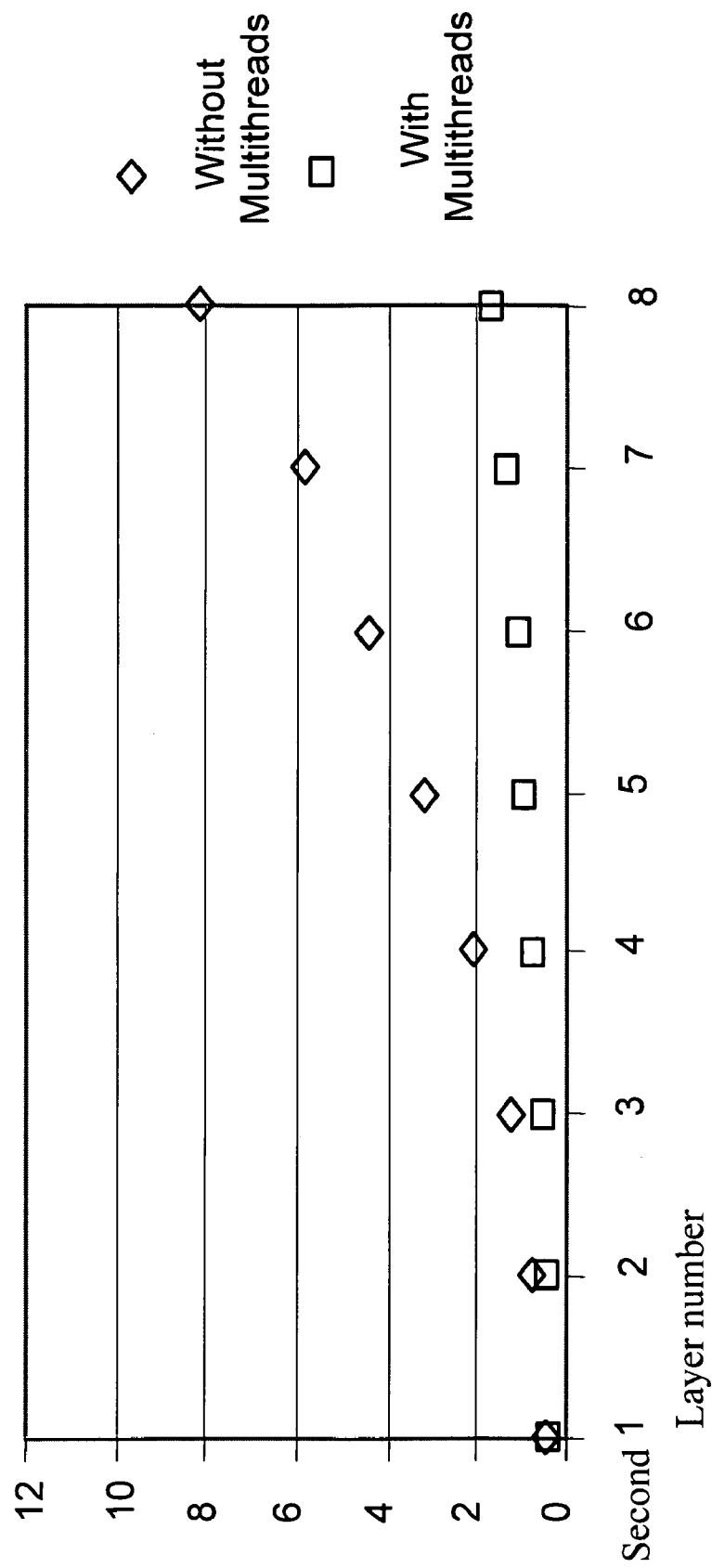
FIG. 15 illustrates client response times of multilayer accessing with or without multithread.
Figure 16:
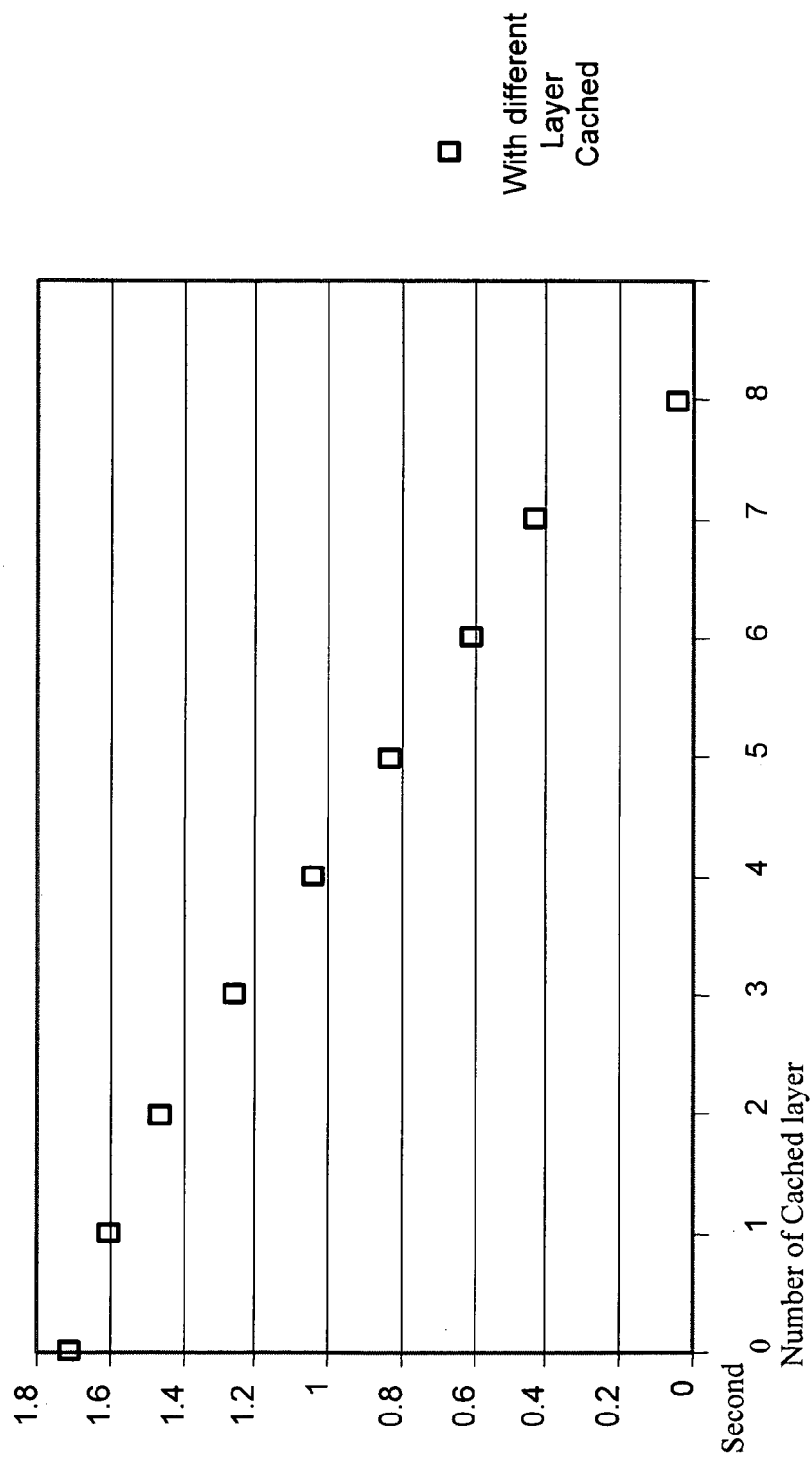
FIG. 16 illustrates client response times of multilayer access with different numbers of caching and without caching.

Geographic information may be organized as layers in a hierarchical framework as shown in FIGS. 14A and 14B. Normally, WebGIS may organize data into different layers and access these layers individually from the server side. When multilayer data is presented on the client side and/or whenever the client changes the display area or resolution, the operation may invoke requests to the multilayer datasets. This common operation may require frequent access to each layer residing on the server. Therefore, the response time of the server may affect the performance of WebGIS. The performance of this multilayer-accessing in CyberGIS may be compared with the multithread enabled and disabled. The datasets used in the comparison of this section and the immediate section below may be found in the world dataset of ArcGIS Data & Maps CDs provided by ESRI. They are geogrid-55 kbyte, cities-70 kbyte, world30-141 kbyte, lakes-177 kbyte, drainage-299 kbyte, country-391 kbyte, rivers-464 kbyte and latlong-547 kbyte. As illustrated in FIG. 15, the response time of multithread-enabled system may increase much slower than without the multithread technique, when the number of layers requested increases. Cachng may also be used to save transportation time. The cache of one layer may save time used for one request. More layers being cached will likely result in more transportation time being saved, as shown in FIG. 16.

3. Multiuser Concurrent Accessing

Figure 17:
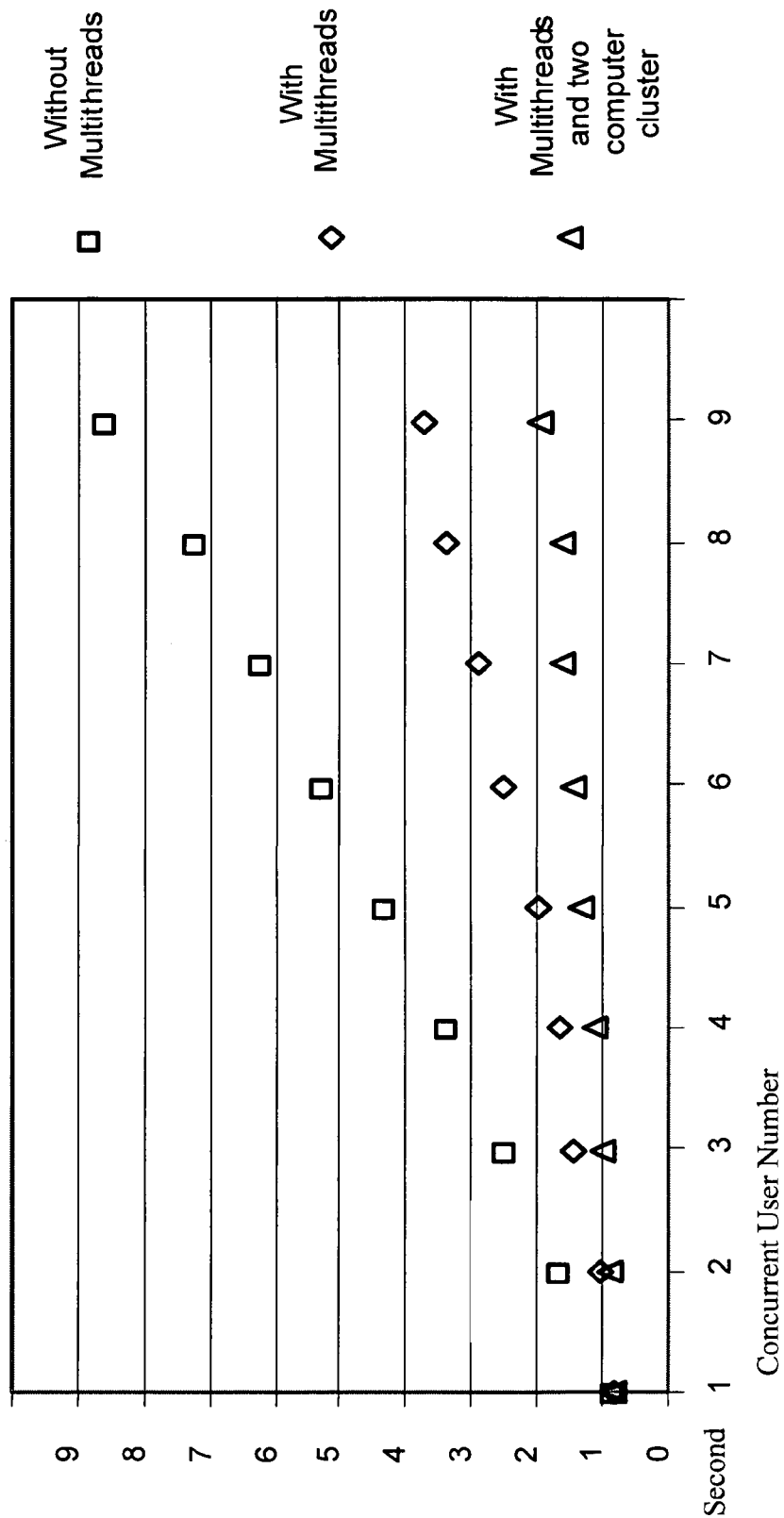
FIG. 17 illustrates server response times to concurrent users' access with three different settings: (1) without multithreads, (2) with multithreads and (3) with multithreads and a two-computer cluster.

It is likely that many users will access the same WebGIS application when it is opened to the public. The ability to respond to many users simultaneously within a reasonable time may be critical from a pragmatic perspective. The performance of multiuser concurrent-access between multithread-enabled servers and single-thread servers may be compared. Results shown in FIG. 17 were generated in a test where the multiuser concurrent-access may be generated at the client side automatically by issuing multiple data requests, and where only four layers may be requested for each user access. When the number of concurrent users increases, the response time of the single-thread server should increase dramatically, while the response time of the multithread-enabled server should increase at a much slower pace. When the number of concurrent users exceeds eight, the single-thread server response should exceed 7 seconds, which may not be acceptable to some users, while the multithread servers may still function very well. When the cluster technique is added onto the multithread servers, as shown in FIG. 17, it may further improve the performance of the system especially when the number of concurrent users gets larger. Moreover, for a given time-out value, adopting a cluster technique may help to support a bigger number of users. For example, a single thread server may support two users with a time-out of two seconds, while a multithread server may support five users, and the two-computer cluster 160 may support nine users.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize that the present invention may be used in a vehicular geographic positioning system, in real estate or even in navigation in bodies of water.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A geographic information system comprising:
   a. a multithreading client, wherein said client includes:
      1) at least one user interface capable of interacting with a user;
      2) at least one client coordinator capable of managing said client functions based upon information received from a server and said user interface;
      3) map data;
      4) at least one map manager capable of managing said map data;
      5) at least one client-side spatial analyzer capable of processing said map data;
      6) at least one cache manager capable of managing cache resources;
      7) at least one data requester capable of requesting and interpreting at least one dataset;
      8) at least one information communicator capable of using a predetermined communications protocol, a binary compressor, and a binary decompressor; and
   b. a hardware multithreading server cluster configured with at least two sets of hardware servers with a redundant network interconnection, wherein said hardware multithreading server cluster includes:
      1) at least one servlet capable of
         a) communicating to said information communicator through a network;
         b) using said predetermined communications protocol;
         c) using said binary compressor; and
         d) using said binary decompressor;
      2) at least one image accessor capable of using an optimized data access mechanism, the optimized data access mechanism using:
         a) a hash index mechanism configured to locate data pieces using a hash function of coordinates of said data pieces; and
         b) a cut mechanism configured to:
            i) generate cut data pieces by cutting data pieces according to a requested area; and
            ii) reassemble said cut data pieces to get a response data;
      3) at least one map configuration mechanism capable of making dynamic request;
      4) at least one data storage access mechanism capable of using binary indices for storage and retrieval of data;
      5) at least one data source manager capable of managing at least one of said data storage access mechanism; and
      6) at least one server-side spatial manager capable of processing said at least one dataset.

2. A system according to claim 1, wherein said dataset includes map management information.

3. A system according to claim 1, wherein said dataset includes map data.

4. A system according to claim 1, wherein said dataset includes map configuration data.

5. A system according to claim 1, wherein said dataset includes command data.

6. A system according to claim 1, wherein said network is at least one of the following:
   a. the Internet;
   b. a wireless network; and
   c. a network capable of using at least one Internet protocol.

7. A system according to claim 6, wherein said at least one Internet protocol includes TCP/IP and HTTP.

8. A system according to claim 1, wherein said optimized data access mechanism uses a pyramid mechanism.

9. A method of providing geographic information, said method:
   a. using a multithreading client, wherein said client:
      1) interacts with a user;
      2) manages client functions with a client coordinator based upon information received from a server and said user interface;
      3) maps map data;
      4) manages map data;
      5) processes map data;
      6) managing cache resources;
      7) requesting and interpreting at least one dataset; and
      8) using a predetermined communications protocol, a binary compressor and a binary decompressor; and
   b. using a hardware multithreading server cluster, wherein said hardware multithreading server cluster:
      1) uses a service that:
         a) communicates with said information communicator through a network;
         b) uses said predetermined communications protocol;
         c) uses said binary compressor; and
         d) uses said binary decompressor;
      2) accesses images using an optimized data access mechanism, said optimized data access mechanism using:
         a) a hash index mechanism configured to locate data pieces using a hash function of coordinates of said data pieces; and b) a cut mechanism configured to:
    i) generate cut data pieces by cutting data pieces according to a requested area; and
    ii) reassemble said cut data pieces to get a response data;
3) configures maps for making dynamic requests;
4) uses binary indices for storing and retrieving data;
5) manages stored data; and
6) processes said at least one dataset.

10. A method according to claim 9, wherein said at least one dataset maps management information.

11. A method according to claim 9, wherein said at least one dataset maps map data.

12. A method according to claim 9, wherein said at least one dataset maps configuration data.

13. A method according to claim 9, wherein said at least one dataset commands data.

14. A method according to claim 9, wherein said network is at least one of the following:
  a. the Internet;
  b. a wireless network; and
  c. a network capable of using at least one Internet protocol.

15. A method according to claim 14, wherein said at least one Internet protocol includes TCP/IP and HTTP.

16. A method according to claim 9, wherein said optimized data access mechanism uses a pyramid mechanism.

* * * * *